United States Patent [19]

Lo

[11] Patent Number: 5,493,562
[45] Date of Patent: Feb. 20, 1996

[54] APPARATUS AND METHOD FOR SELECTIVELY STORING ERROR STATISTICS

[76] Inventor: William Lo, 1730 Halford Ave., #244, Santa Clara, Calif. 95051

[21] Appl. No.: 337,635

[22] Filed: Nov. 10, 1994

[51] Int. Cl.$^6$ .............................. H04B 17/02; H04J 3/14
[52] U.S. Cl. ..................... 370/17; 370/94.1; 371/20.2
[58] Field of Search .................................. 370/13, 14, 17, 370/60, 94.1, 97, 99; 371/15.1, 20.1, 20.2, 29.1; 375/211, 213, 224; 340/825.06

[56] References Cited

U.S. PATENT DOCUMENTS

| | | |
|---|---|---|
| 4,680,755 | 7/1987 | Reames . |
| 4,817,080 | 3/1989 | Soha .......................................... 370/13 |
| 4,901,348 | 2/1990 | Nichols et al. . |
| 5,099,517 | 3/1992 | Gupta et al. . |
| 5,161,192 | 11/1992 | Carter et al. . |
| 5,177,788 | 1/1993 | Schanning et al. . |
| 5,179,554 | 1/1993 | Lomicka et al. . |
| 5,243,543 | 9/1993 | Notess ...................................... 370/13 |
| 5,251,203 | 10/1993 | Thompson . |
| 5,315,580 | 5/1994 | Phaal ........................................ 370/13 |
| 5,353,353 | 10/1994 | Vijeh et al. . |
| 5,365,514 | 11/1994 | Hershey et al. .......................... 370/17 |

OTHER PUBLICATIONS

"Lecture Notes In Computer Science," Edited by Goos, G. and Hartmanis, J., Local Area Network Security, Edited by Berson, T. A. and Beth, T., Workshop LANSEC '89, E.I.S.S. Karlsruhe, FRG, Apr. 3–6, 1989, pp. 31–52.

Primary Examiner—Hassan Kizou
Attorney, Agent, or Firm—Townsend and Townsend and Crew

[57] ABSTRACT

A circuit including a data formatter for receiving desired information associated with a data packet and arranging the bits into a format for transfer to a memory, a memory for storing the desired information for later access by a microprocessor, and a controller for selectively transferring and writing the desired information from the data formatter to the memory. The circuit provides improved performance by storing only the desired information for a data packet having an error. That is, information internal to the data packet itself, such as the source address, and information external to the data packet, such as the repeater port number, in addition to data packet error information, such as error conditions, may be stored as an error statistic in a memory for a microprocessor to read at its leisure.

19 Claims, 1 Drawing Sheet

APPARATUS AND METHOD FOR SELECTIVELY STORING ERROR STATISTICS

BACKGROUND OF THE INVENTION

The present invention relates to gathering error statistics in a computer network, and more particularly to a circuit and method useful in network management that selectively stores error statistics of data packets transmitted in a computer network.

For any application of a network of computers, keeping the network operating smoothly is of paramount importance. Monitoring data packet transmission on the network and identifying error conditions enhances a user's ability to locate problems in the network. That is, information such as the types of errors, frequency of occurrence, and source of errors may point to a particular problem in the network. Accordingly, the user is able to take corrective action to provide for increased reliability of the network.

In a simple network, it is possible for a user to monitor the network manually for errors. In larger, more complicated networks, manual monitoring of the network becomes cumbersome and inadequate. Large networks require more sophisticated, automatic management. A network implementing automatic monitoring and management is referred to as a managed network. In such a network, an ability to obtain particularized information on various error statistics is invaluable in troubleshooting problems on the network.

In one typical managed network, such as a network based on the IEEE 802.3 standard (hereby expressly incorporated by reference for all purposes), a data packet transmitted by one data terminal equipment (DTE), e.g., an end station, to another DTE passes through at least one repeater. Because all data packets pass through a repeater, the repeater is a convenient place to gather error statistics for network management.

Gathering error statistics of various data packets at the repeater is possible by connecting a management unit to the repeater. A repeater with a management unit is referred to as a managed repeater. When the managed repeater receives a data packet, the repeater transmits the data packet to the management unit which performs various functions on the data packet. Some of the management unit functions include formatting the data packet upon receipt, performing error detection, and flagging error conditions.

One way to accumulate error statistics at the managed repeater is to use a first type of management unit (type-I) that includes internal hardware to detect errors, to count the number of occurrences of different error conditions, and to store those counts in an internal random access memory (RAM) of the management unit. When a particular error condition exists in a data packet sent to the managed repeater, the hardware within the management unit detects and flags the error, and then increments an appropriate register. To obtain error statistics, a microprocessor is able to simply read the various registers within the type-I management unit and obtain a total count of the various types of errors. One example of a type-I managed repeater is the IMR+/HIMIB chip set (P/Ns AM79C981 (IMR) and AM79C987 (HIMIB)) produced by Advanced Micro Devices of Sunnyvale, Calif.

A type-I managed repeater is sufficient for many tasks, but for some applications, performance is not optimum in that the statistics reflect only an aggregate number of errors accumulated over many data packets. Error statistics on a packet-by-packet basis are not available. In some cases, it is desirable to know error statistics for particular data packets.

It is known to use a different and more common implementation of a managed repeater that has the ability to accumulate error statistics on a packet-by-packet basis. This implementation of a managed repeater includes a second type of management unit (type-II) for the repeater. A type-II management unit consists of a media access controller (MAC), a RAM, and a microprocessor.

In the type-II managed repeater, a data packet from an end station is received by the repeater, which then passes the data packet to the MAC. The MAC strips the preamble and the start frame delimiter from the data packet, and then formats the remaining frame of the data packet from a serial data stream to a parallel data stream. The MAC writes the entire content of the frame of the data packet into the RAM. The microprocessor reads the content of the RAM and processes it according to the user's programmed software. This software implements error detection and extracts the desired error statistics from the data packets.

The type-II management unit is inefficient and expensive, because all data packets, even error-free packets, are stored and processed. It is possible for thousands of data packets to pass through the network every second. The type-II managed repeater requires both a large RAM to store the large quantity of data generated bytes rapidly incoming data packets, and a fast, powerful microprocessor to process all the data and gather error statistics.

Moreover, the type-II management unit is inefficient in gathering some types of sophisticated error statistics. For example, if a user desires to know the error condition of a particular data packet, as well as a corresponding physical port of that data packet, the type-II management performs partly, if at all. Even assuming that the management unit uses a MAC that is equipped to flag different error conditions, the management unit must still store and process every data packet. Because of the speed at which data packets flow into the MAC and then into the RAM, by the time the MAC flags a particular error, the microprocessor cannot determine the physical port of the data packet associated with the flagged error. In order to determine what physical port is associated with a certain error, the microprocessor must read and process the contents of all the data packets in the RAM in real-time. Thus, a type-II management unit is inefficient and expensive in gathering more sophisticated error statistics. Often external hardware is needed in addition to the repeater and management unit to determine the physical port information.

SUMMARY OF THE INVENTION

The present invention provides apparatus and method for selectively storing error statistics for only those data packets having an error. The invention has various advantages over the prior art, including being more efficient and economic in gathering error statistics of data packets, as well as providing an increased capability to determine sophisticated error statistics on a packet-by-packet basis.

According to one aspect of the invention, the invention provides a circuit including a data formatter for receiving desired information associated with a data packet and arranging the bits into a format for transfer to a memory, a memory for storing the desired information for later access by a microprocessor, and a controller for selectively transferring and writing the desired information from the data formatter to the memory. The preferred embodiment provides improved performance by storing only the desired information for those data packets having an error. That is, information internal to the data packet itself, such as the source address, and information external to the data packet, such as the repeater port number, in addition to data packet error information, such as error conditions, are stored as an error statistic in a memory for a microprocessor to read at the convenience of the microprocessor.

Thus, by selectively storing only the information desired by a user for gathering error statistics and only storing only such information for data packets having errors, an advantage of the invention is realized. Namely, the invention reduces processing requirements for a microprocessor, thereby allowing use of a slower, less expensive microprocessor. Additional advantages of the invention are that it dispenses with a MAC and does not require a very large memory that would be necessary to save all the data packets indiscriminately.

A further understanding of the nature and advantages of the invention may be realized by reference to the remaining portions of the specification and the drawings.

DESCRIPTION OF THE PREFERRED EMBODIMENT

Figure 1:
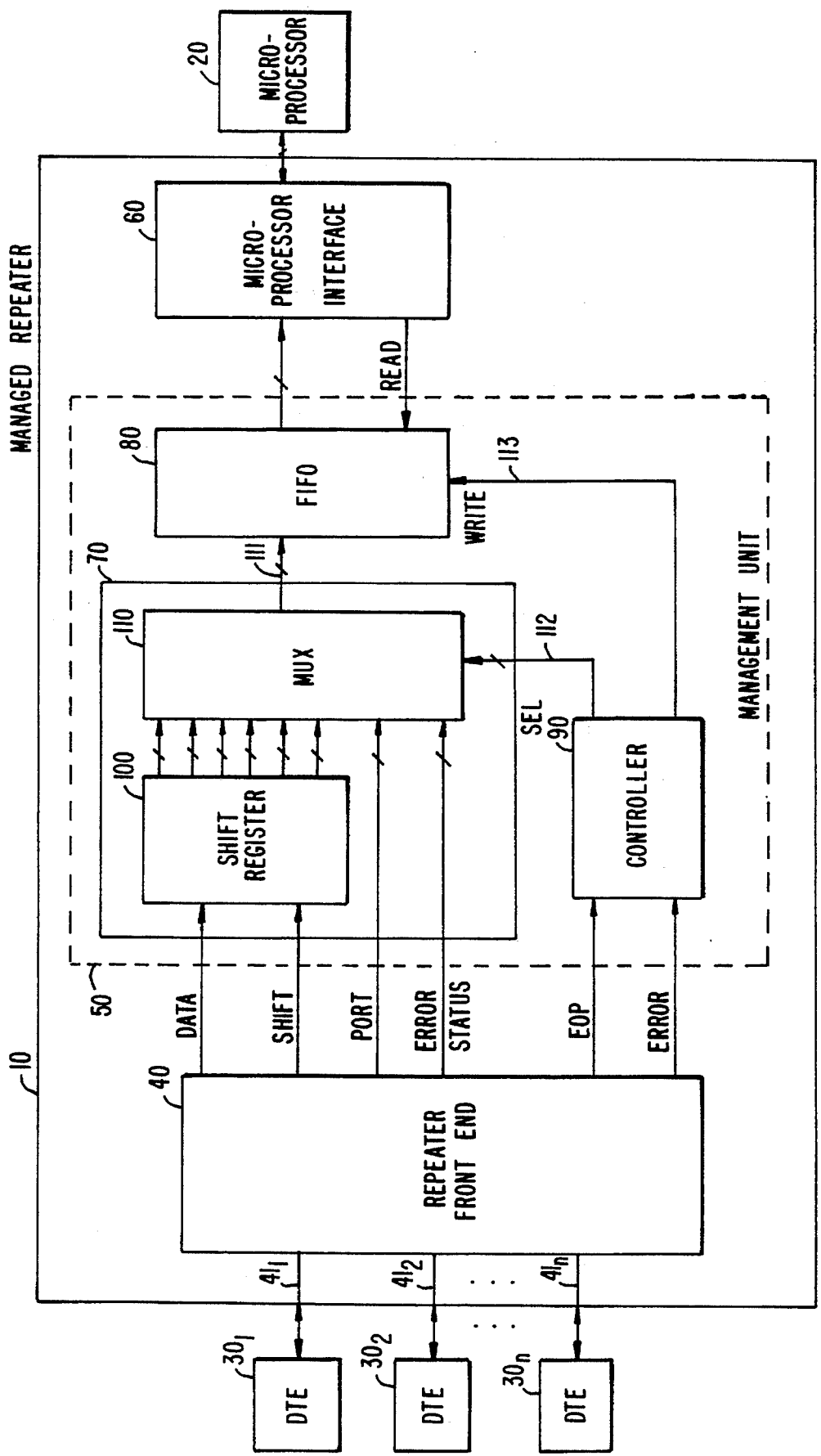
FIG. 1 is a detailed schematic block diagram of a preferred embodiment of the present invention.

FIG. 1 is a detailed schematic block diagram of a managed repeater 10, a microprocessor 20 and a plurality of data terminal equipment (DTE) $30_i$. Managed repeater 10 includes a repeater front end 40 having a plurality of ports $41_i$, a management unit 50, and a microprocessor interface 60.

One DTE $30_1$ passes a data packet through managed repeater 10 to another DTE $30_2$. In managed repeater 10, repeater front end 40 receives the data packet at one port $41_1$ and broadcasts the data packet from other ports $41_i$.

Repeater front end 40 also processes the data packet to generate a plurality of error statistic signals, with each of the signals containing either some data, an error condition, or status control information. The error statistic signals are used for use by management unit 50 in extracting and storing an error statistic of the data packet. The error statistic signals containing the constituent parts of the error statistic of the data packet include a series of bits which may require some formatting prior to storage. Management unit 50 receives the error statistic signals and formats the error statistic of the data packet for storage, and later access by microprocessor 20. Microprocessor 20 accesses the error statistic via microprocessor interface 60.

In the preferred embodiment of the present invention, the repeater front end 40 incorporates a core of the Advanced Micro Devices' IMR+/HIMIB chip set. The management hardware circuitry produces the management information base (MIB) or statistics according to the incorporated IEEE standard 802.3. Of course, a repeater with a management unit generating the desired error statistic signals could be modified to incorporate the present invention.

Management unit 50 includes a data formatter 70, a memory 80, and a controller 90. Data formatter 70 receives the error statistic signals of interest from repeater front end 40. Data formatter 70 arranges the bits of the error statistic into a format for transfer into storage. Memory 80 coupled to data formatter 70 stores the error statistic. Controller 90 controls a transfer of the error statistic from data formatter 70 into memory 80. Controller 90 is responsive to a particular error status signal, called the error signal, from repeater front end 40, that indicates that the data packet has an error. When the repeater front end 40 asserts the error signal, controller 90 synchronously transfers and writes the error statistic from data formatter 70 into memory 80. Thus, management unit 50 stores an error statistic only for a data packet with an error. Synchronously, in the preferred embodiment, refers to coordinating data transfer out of data formatter 70 and writes into memory 80.

According to the preferred embodiment, management unit 50 stores an error statistic with constituent parts including: the source address of the data packet; a port number identifying the physical port that received the data packet; and error conditions of the data packet, such as frame check sequence (FCS) error, alignment error, long frame, short event, runt, data rate error, and jabber. Other embodiments of the present invention may store other statistics in addition to or in place of some or all of those listed, depending upon a specific implementation.

In the preferred embodiment, repeater front end 40 generates the following error statistic signals: a data signal containing a portion of the data packet, a port signal identifying the port number of the source port, an error status signal containing an error condition associated with the data packet, a shift signal for identifying the portion, an end-of-packet signal indicating an end of the data packet, and an error signal indicating when the data packet contains an error.

Data formatter 70 includes a shift register 100 and a multiplexer 110 having eight 1-byte inputs and a select input for successively routing each byte at one of the inputs to an output 111.

Shift register 100 receives the data signal containing the desired portion of the data packet and the shift signal. The shift signal, provided from repeater front end 40, controls storage of the desired data packet portion into shift register 100.

The repeater front end 40 transmits the entire data packet in a serial bit stream to shift register 100. Shift register 100 arranges the serial input into six 1-byte parallel outputs. Repeater front end 40 shifts the serial bit stream into shift register 100 until the repeater front end 40 deasserts the shift signal. Repeater front end 40 deasserts the shift signal once the desired portion of the data packet has been completely shifted into shift register 100.

Preceded by a preamble (56 bits of an alternating pattern 1,0) and a start frame delimiter (SFD) (10101011), a data packet's frame starts with a destination address field (a fixed length of 48 bits), followed by a source address field (a fixed length of 48 bits). Because the desired portion of the data packet is the source address field, the repeater front end 40 merely asserts the shift signal to shift in the serial bit stream until 96 bits beyond the SFD have been counted. Shift register 100 only stores 48 bits (six bytes at eight bits/byte), therefore, only the last 48 bits (i.e., the source address) is stored prior to deassertion of the shift signal. At this point, the repeater front end 40 has stored the source address field into shift register 100 in a format ready for transfer to storage.

In this implementation of the present invention, managed repeater 10 includes the capability for storing just those internal portions of the data packet of interest, rather than storing the entire frame of a data packet as in the prior art. For storing different portions of a data packet as part of an error statistic for the data packet, the user is able to alter the size of shift register 100 and the shift signal assertion timing, among other obvious modifications. The particular portion stored is a design choice that is not central to the present invention. In the preferred embodiment, it is desirable to store a particular portion, though other portions or several portions could be stored. In some embodiments, managed repeater 10 could be programmed to select particular portions for storage depending upon various control signals, as well known in the art.

Multiplexer 110 successively routes the bytes at the eight inputs to an output 111. Output 111 is coupled to memory 80. Multiplexer 110, responsive to a series of select signals asserted at a select input 112, transfers the bytes one at a time to memory 80. The bits of the source address field that have been formatted by shift register 100 are on six of the inputs to multiplexer 110. The port signal is present at one input to multiplexer 110 and contains a 4 bit value that represents a port number of the managed repeater 10. The port number identifies a physical port of the repeater receiving the data packet. The error status signal is present at another input to multiplexer 110 and contains bits indicating error conditions associated with the data packet.

Memory 80, coupled to multiplexer 110, stores the error statistics in response to write signals from controller 90. In the preferred embodiment, memory 80 is implemented as a 4 byte-wide first-in-first-out memory. However, implementation of memory 80 is a design choice that is not central to the invention. For example, memory 80 may also be implemented otherwise, such as with a RAM, with the appropriate modifications to the controller being obvious to one skilled in the art.

Controller 90 receives an error signal and an end-of-packet signal from repeater front end 40. When repeater front end 40 reaches the end of the data packet and has completed processing of the data packet so that the statistics on the error status signal, as well as the port signal, are valid, repeater front end 40 asserts the end-of-packet signal. Upon detecting an error associated with the data packet, repeater front end 40 asserts the error signal.

When repeater front end 40 asserts concurrently the error signal and the end-of-packet signal, controller 90 asserts a series of select signals to the select input 112 of the multiplexer 110 and synchronously asserts a series of write signals to the memory 80. However, if the error signal is not asserted concurrently with the end-of-packet signal, controller 90 does not assert the select signals or the write signals.

When controller 90 asserts a select signal, multiplexer 110 routes the least significant byte from shift register 10 to output 111. Controller 90 then asserts a write signal to memory 80 so the byte on output 111 of multiplexer 110 is written into memory 80, thereby storing the byte value. Controller 90 continues to assert select signals and write signals until all bytes in shift register 10 as well as the in the port signal and the error status signal are written into memory 80.

Once an error statistic of the data packet having an associated error is stored in memory 80, microprocessor 20 may then read the error statistics stored in memory 80 when convenient. Microprocessor 20 reads the error statistics via a microprocessor interface 60. Microprocessor 20 asserts a read signal to access the error statistics. It is also possible for controller 90 to assert a status flag to microprocessor 20 to signify that the memory 80 contains an error statistic available for access. According to the preferred embodiment of the present invention, microprocessor 40 simply reads the error statistics for data packets with errors that have been stored in memory 80, rather than being overburdened with the task of quickly processing massive quantities of data packets for errors.

Although the invention has been described in terms of a preferred embodiment, it will be obvious to those skilled in the art that various alternatives, modifications and equivalents may be made without departing from the invention. Therefore, the above description should not be taken as limiting the scope of the invention which is defined by the appended claims.

What is claimed is:

1. In a managed repeater having a source port for receiving a data packet, and a repeater front-end for generating a data signal containing a portion of the data packet, a port signal identifying the port number of the source port, and an error signal indicating when the data packet contains an error condition, a circuit for selectively storing an error statistic of the data packet, said circuit comprising:

a data formatter for receiving the data signal and an error code from the repeater front end and arranging bits of the portion and said error code into a format for transfer from an output of said data formatter;

a memory, coupled to said output of said data formatter, for storing the portion and said error code upon transfer; and a controller, coupled to said data formatter and to said memory storage device and responsive to an assertion of the error signal, for synchronously transferring and writing the portion and said error code from said output of said data formatter into said memory.

2. The circuit as set forth in claim 1, wherein said data formatter arranges bits of the port number into said format, and said controller transfers and writes the port number into said memory.

3. The circuit as set forth in claim 1, said memory comprising a first-in-first-out memory.

4. The circuit as set forth in claim 1, said memory comprising a random access memory.

5. The circuit as set forth in claim 1, further comprising:

a microprocessor interface, coupled to said memory, for accessing said memory; and a microprocessor, coupled to said microprocessor interface, for reading an error statistic of the data packet from the portion and said error code in said memory.

6. The circuit as set forth in claim 5, wherein:

said controller, also coupled to said microprocessor, further asserts a memory status signal to communicate to said microprocessor that the portion and said error code in said memory are available for access.

7. The circuit as set forth in claim 1, wherein the portion comprises a source address field of the data packet.

8. The circuit as set forth in claim 1, wherein the managed repeater further generates a shift signal for identifying the portion, an error status signal identifying the error condition associated with the data packet, and an end-of-packet signal indicating an end of the data packet, and wherein:

said data formatter receives the data signal, the port signal, and said error status signal and arranges the bits of the portion, and the error condition into said format for transfer from said output of said data formatter;

said memory, coupled to said output of said data formatter, stores the portion, and the error condition upon transfer; and said controller, synchronously transfers and writes the portion, and the error condition from said output of said data formatter into said memory, wherein said controller is responsive to the concurrent assertion of the end-of-packet signal and the error signal, to initiate transfer.

9. The circuit as set forth in claim 8, wherein:

said controller synchronously asserts a series of select signals and a series of write signals, responsive to the concurrent assertion of the end-of-packet signal and the error signal; and said data formatter comprises a shift register for receiving the data signal and converting a serial bit stream into a parallel bit stream until said shift register contains the portion for transfer, wherein said shift register locks responsive to the deassertion of the shift signal;

a multiplexer having a first input coupled to said shift register for receiving the portion, a second input for receiving a port number, a third input for receiving the error condition, and a select input coupled to said controller, wherein said multiplexer, responsive to said series of select signals at said select input, incrementally transfers the portion, the port number, and the error condition from an output of said multiplexer to said memory; and wherein said output of said data formatter includes said output of said multiplexer; and wherein said memory, coupled to said output of said multiplexer and to said controller, is responsive to said series of write signals from said controller, for storing the portion, the port number, and the error condition.

10. The circuit as set forth in claim 1 wherein said data formatter receives the port signal and arranges the port signal into said format for transfer from said output of said data formatter.

11. The circuit as set forth in claim 1 wherein said controller, responsive to the error signal, synchronously transfers and writes the portion when the port signal indicates the error statistic is associated with a particular preselected port.

12. The circuit as set forth in claim 1 wherein said controller, responsive to the error signal, synchronously transfers and writes the portion when the error signal indicates the error statistic is associated with a particular preselected type of error.

13. The circuit as set forth in claim 1 wherein said assertion of the error signal is programmable.

14. The circuit as set forth in claim 13 wherein the error signal is asserted only when the port signal indicates said error code is associated with a preselected port.

15. The circuit as set forth in claim 13 wherein the error signal is asserted only when said error code is associated with a preselected type of error condition.

16. In a network including a repeater for receiving a data packet at a source port, an improved managing circuit for selectively storing an error statistic of the data packet, said improved managing circuit comprising:

a repeater front end, coupled to the repeater, for processing the data packet to generate a data signal containing a portion of the data packet, a port signal identifying the port number of the source port, an error status signal identifying an error condition associated with the data packet, an end-of-packet signal indicating an end of the data packet, and an error signal indicating when the data packet contains said error condition;

a data formatter, coupled to said repeater front end, for receiving said data signal, said port signal, and said error status signal and arranging the bits of said portion, said port number, and said error condition for transfer from an output of said data formatter;

a memory, coupled to said output of said data formatter, for storing said portion, said port number, and said error condition upon transfer; and a controller, coupled to said repeater front end, to said data formatter, and to said memory, for synchronously transferring and writing said portion, said port number, and said error condition from said output of said data formatter into said memory, wherein said controller is responsive to the concurrent assertion of said end-of-packet signal and said error signal.

17. In a network having a data packet received at a source port of a device, a data signal containing a portion of the data packet, a port signal identifying the source port, and an error signal indicating when the data packet contains an error condition, a method for selectively storing an error statistic of the data packet, said method comprising:

receiving the data signal and an error status signal;

arranging the bits of the portion and said error status signal into a format for transfer;

selecting the portion and said error status signal for transfer to storage, wherein said selecting step is responsive to the assertion of the error signal; and storing the portion and said error status signal upon transfer.

18. The error statistic storing method of claim 17, further comprising the steps of receiving and arranging bits of the port number from the device; and storing the port number with the portion and said error status signal.

19. The method as set forth in claim 17 wherein said arranging step further arranges the port signal into said format.

* * * * *